United States Patent
Wildman

(10) Patent No.: US 10,190,608 B2
(45) Date of Patent: Jan. 29, 2019

(54) ACTUATOR

(71) Applicant: AIRBUS OPERATIONS LIMITED, Bristol (GB)

(72) Inventor: Eric Wildman, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 258 days.

(21) Appl. No.: 15/213,562

(22) Filed: Jul. 19, 2016

(65) Prior Publication Data

US 2017/0023031 A1    Jan. 26, 2017

(30) Foreign Application Priority Data

Jul. 21, 2015  (GB) .................................. 1512842.4

(51) Int. Cl.
| | |
|---|---|
| *F15B 15/14* | (2006.01) |
| *F15B 20/00* | (2006.01) |
| *B64C 3/56* | (2006.01) |
| *B64C 13/42* | (2006.01) |
| *F15B 15/08* | (2006.01) |
| *F16H 25/20* | (2006.01) |
| *F15B 15/20* | (2006.01) |

(52) U.S. Cl.
CPC .............. *F15B 20/004* (2013.01); *B64C 3/56* (2013.01); *B64C 13/42* (2013.01); *F15B 15/088* (2013.01); *F15B 15/14* (2013.01); *F16H 25/20* (2013.01); *F15B 2015/206* (2013.01); *Y02T 50/145* (2013.01)

(58) Field of Classification Search
CPC .. F15B 15/08; F15B 15/088; F15B 2015/206; F15B 20/004
See application file for complete search history.

(56) References Cited

U.S. PATENT DOCUMENTS 4,481,864 A  * 11/1984  Peruzzi ................. F15B 15/261
                                                                92/33
4,530,271 A  *  7/1985  Cronin .................... F15B 18/00
                                                               91/437

(Continued)

FOREIGN PATENT DOCUMENTS

DE        102010036203 A1    3/2012
EP           487297 A1    5/1992

(Continued)

OTHER PUBLICATIONS

European Search Report dated Dec. 21, 2016 EP Application No. 16 17 7730.

(Continued)

*Primary Examiner* — Michael Leslie
(74) *Attorney, Agent, or Firm* — Nixon & Vanderhye P.C.

(57) ABSTRACT

An actuator comprising: an inner cylinder received in an outer cylinder and a piston received in the inner cylinder that extends from the inner cylinder and the outer cylinder, the piston being slideable relative to the inner cylinder and the outer cylinder in response to the application of fluid pressure to cause the piston to extend further from the inner cylinder and the outer cylinder; and an auxiliary drive mechanism operable to cause the inner cylinder to extend from the outer cylinder, wherein the piston moves together with the inner cylinder relative to the outer cylinder.

15 Claims, 5 Drawing Sheets

(56) References Cited

U.S. PATENT DOCUMENTS

| | | | |
|---|---|---|---|
| 4,876,906 | A | 10/1989 | Jones |
| 5,076,379 | A | 12/1991 | Bahr et al. |
| 5,310,138 | A | 5/1994 | Fitzgibbon |
| 2012/0011950 | A1 | 1/2012 | Kracke |
| 2013/0327883 | A1 | 12/2013 | Kordel et al. |

FOREIGN PATENT DOCUMENTS

| | | |
|---|---|---|
| EP | 2309150 A1 | 4/2011 |
| EP | 2674356 A2 | 12/2013 |
| JP | 2000074010 A | 3/2000 |

OTHER PUBLICATIONS

Search Report dated Jan. 21, 2016 in Great Britain Application No. 1512842.4.

* cited by examiner

ACTUATOR

RELATED APPLICATIONS

The present application claims priority from Great Britain Application Number 1512842.4, filed Jul. 21, 2015, the disclosure of which is hereby incorporated by reference herein in its entirety.

TECHNICAL FIELD

The present invention relates to an actuator. The present invention also relates to an actuator for use in moving an aerodynamic surface of an aircraft.

BACKGROUND

In the field of aeronautics it is known that the heavier an aircraft and its payload are, the larger the lift force must be to enable the aircraft to fly. It is also known that one way to increase the lift force is to increase the planform area of the wing. However, to achieve efficient flight, especially in terms of induced drag, it is generally preferred to maintain a high aspect ratio. Therefore, to increase lift and prevent efficiency losses, the span of the aircraft wings are increased.

However, the increasing span of aircraft wings causes problems when trying to load passengers directly from the terminal gate to the aircraft, and vice versa. Such problems include aircraft hitting obstacles, aircraft not being able to use adjacent gates simultaneously, and aircraft not being able to get close enough to the terminal gate for the jet bridge to reach.

To overcome problems such as these, it is known to provide folding wingtips to reduce the wing span to an acceptable distance. However, the current systems for folding wingtips occupy a large volume in the aircraft wing and require multiple redundancies and even alternative back-up systems due to their fragile nature. Failure of the folding system can result in the aircraft being prevented from leaving the runway which causes delays.

SUMMARY

According to the invention, there is provided an actuator comprising: an inner cylinder received in an outer cylinder and a piston received in the inner cylinder that extends from the inner cylinder and the outer cylinder, the piston being slideable relative to the inner cylinder and the outer cylinder in response to the application of fluid pressure to cause the piston to extend further from the inner cylinder and the outer cylinder; and an auxiliary drive mechanism operable to cause the inner cylinder to extend from the outer cylinder, wherein the piston moves together with the inner cylinder relative to the outer cylinder.

In a preferred embodiment, the inner cylinder comprises an outer surface and the auxiliary drive mechanism includes a drive member in engagement with said outer surface to cause the inner cylinder to extend from the outer cylinder in response to rotation of said drive member.

Preferably, the outer surface comprises a helical thread, and the drive member comprises a rotatably mounted drive gear, the drive gear being in threaded engagement with said helical thread such that rotation of the drive gear causes the inner cylinder to extend from the outer cylinder.

In a preferred embodiment, the auxiliary drive mechanism comprises a drive and the drive gear comprises drive engagement elements, wherein the drive cooperates with said drive engagement elements to rotate the drive gear in response to operation of said drive.

Preferably, the drive engagement elements comprise a series of recesses spaced circumferentially around an outside of the drive gear and the drive comprises a driven gear having teeth that cooperate with said recesses.

The drive may further comprise a motor or a manually operated crank connectable to the driven gear.

In a preferred embodiment, the actuator comprises an opening in the inner cylinder to allow fluid to flow into the inner cylinder to apply fluid pressure to the piston and cause it to move relative to the inner cylinder.

Preferably, the opening comprises a valve configured to close upon loss of fluid pressure.

In a preferred embodiment, the inner and outer cylinders include cooperating elements to prevent rotation of the inner cylinder relative to the outer cylinder.

Preferably, the cooperating elements comprise a protrusion on the inner cylinder that is slideably received in an axially extending channel in the outer cylinder.

In a preferred embodiment, the auxiliary drive mechanism further comprises a brake configured to selectively prevent movement of the inner cylinder relative to the outer cylinder.

Preferably, the piston comprises a piston head received in the inner cylinder and a shaft extending out of the inner and outer cylinders through an orifice in an end wall of the inner cylinder.

According to another aspect of the invention, there is provided an aircraft comprising an actuator according to any one of claims 1 to 12.

According to yet another aspect of the invention, there is provided a method of controlling an actuator that comprises an inner cylinder received in an outer cylinder and a piston received in the inner cylinder that extends from the inner cylinder and the outer cylinder, the piston being slideable relative to the inner cylinder and the outer cylinder in response to the application of fluid pressure to cause the piston to extend further from the inner cylinder and the outer cylinder; the method comprising operating an auxiliary drive mechanism to cause the inner cylinder to extend from the outer cylinder so that the piston moves together with the inner cylinder relative to the outer cylinder, in the absence of sufficient fluid pressure to cause the piston to slide relative to the inner cylinder.

The method of controlling the actuator, wherein the auxiliary drive mechanism comprises a drive gear rotatable to cause the inner cylinder to extend from the outer cylinder, the method comprising preventing the drive gear from rotating when the fluid pressure is sufficient to cause the piston to slide relative to the inner cylinder.

BRIEF DESCRIPTION OF THE DRAWINGS

Embodiments of the invention will now be described, by way of example only, with reference to the accompanying drawings, in which.

DETAILED DESCRIPTION

Figure 1:
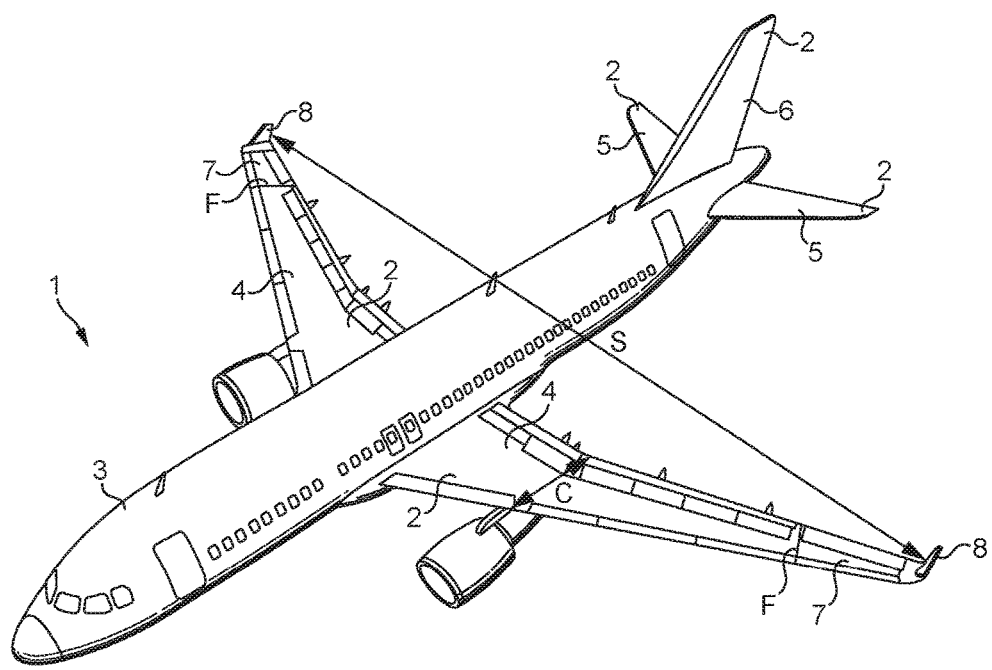
FIG. 1 shows a schematic perspective view of an known aircraft with its wingtips in a flight position.

Referring to FIG. 1, a commercial aircraft 1 of known configuration is shown. The aircraft 1 comprises aerodynamic structures 2 that extend from a fuselage 3. The aerodynamic structures include the main wings 4, tail planes 5 and a vertical tail 6.

The main wings 4 provide the majority of the lift. The larger the planform area of the main wings 4, the more lift they produce. Therefore, larger main wings 4 are preferred so that heavier payloads or more passengers can be transported in one flight.

When designing an aircraft 1, the aspect ratio of the main wings 4 is increased to maximise their efficiency. That is, main wings 4 are designed to have a large span (S) and a comparatively short chord (C). Therefore, to access existing terminal gates the main wings 4 comprise a folding system (not shown in FIG. 1) to fold outboard portions 7 of the main wings 4 along a fold line (F). Therefore, the span (S) of the main wings 4 is effectively reduced. The folding system is only operated when the aircraft 1 is on the ground.

In FIG. 1, the aircraft 1 is shown in flight with the outboard portions 7 of the main wings 4 in their flight positions. The main wings 4 of the aircraft 1 may comprise wingtips 8 extending at an angle to the main wings 4 from the outboard edges of the outboard portions 7 of the main wings 4.

Figure 2:
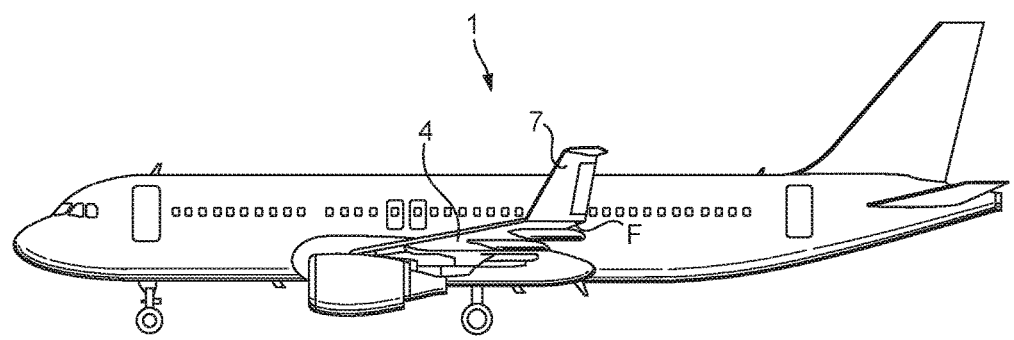
FIG. 2 shows a schematic side view of the aircraft shown in FIG. 1 with its wingtips biased into a folded position by an actuator.
Figure 3:
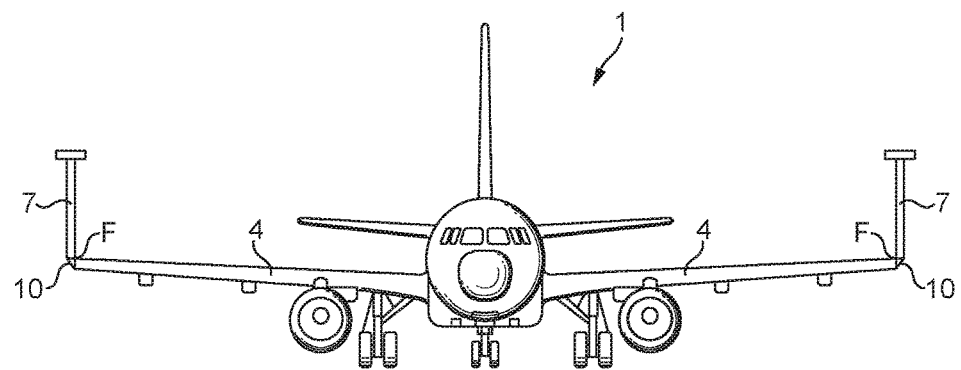
FIG. 3 shows a schematic front view of the aircraft shown in FIG. 1 with its wingtips biased into the folded position by the actuator.

Referring to FIG. 2 and FIG. 3, the aircraft 1 is shown with the outboard sections 7 of the main wings 4 in their folded position. The outboard portions 7 of the main wings 4 are urged from their flight position to their folded position by an actuator 10. In the example shown in FIG. 2 and FIG. 3, the outboard portions 7 are rotated upwards through 90 degrees. However, in an alternative embodiment, the actuator 10 may rotate the outboard portion 7 through an angle of between 0 degrees, its flight position, and 135 degrees. It will be understood that the angle through which the outboard portion 7 rotates may depend on for example, but not limited to, the dihedral angle of the main wing 4, the size of the wingtip 8, and the gate geometry.

Figure 4:
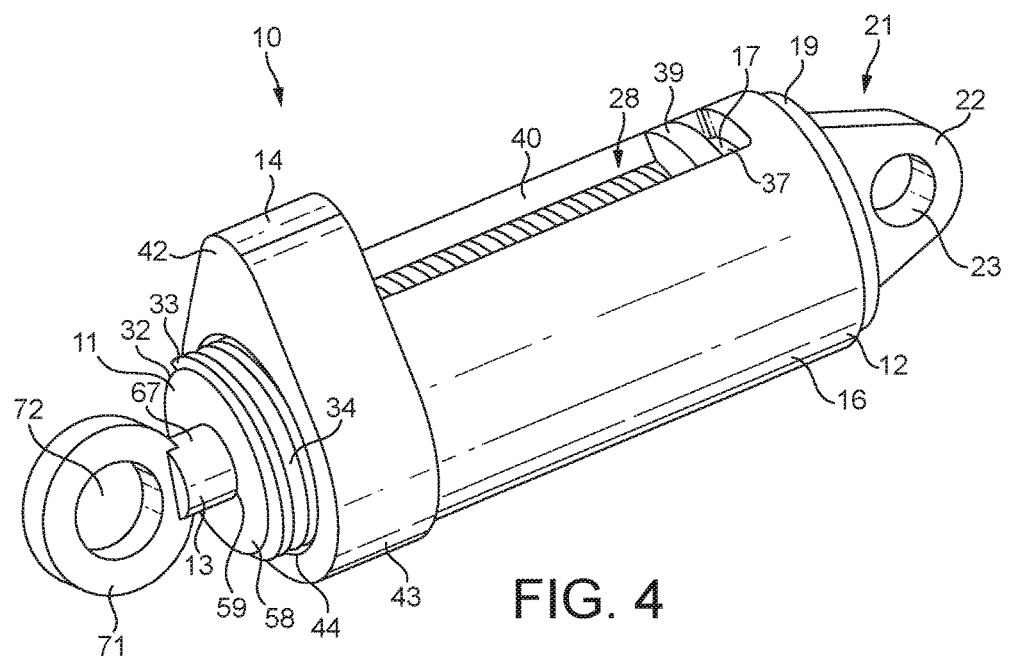
FIG. 4 shows a schematic perspective view of the actuator shown in FIG. 2 and FIG. 3.
Figure 5:
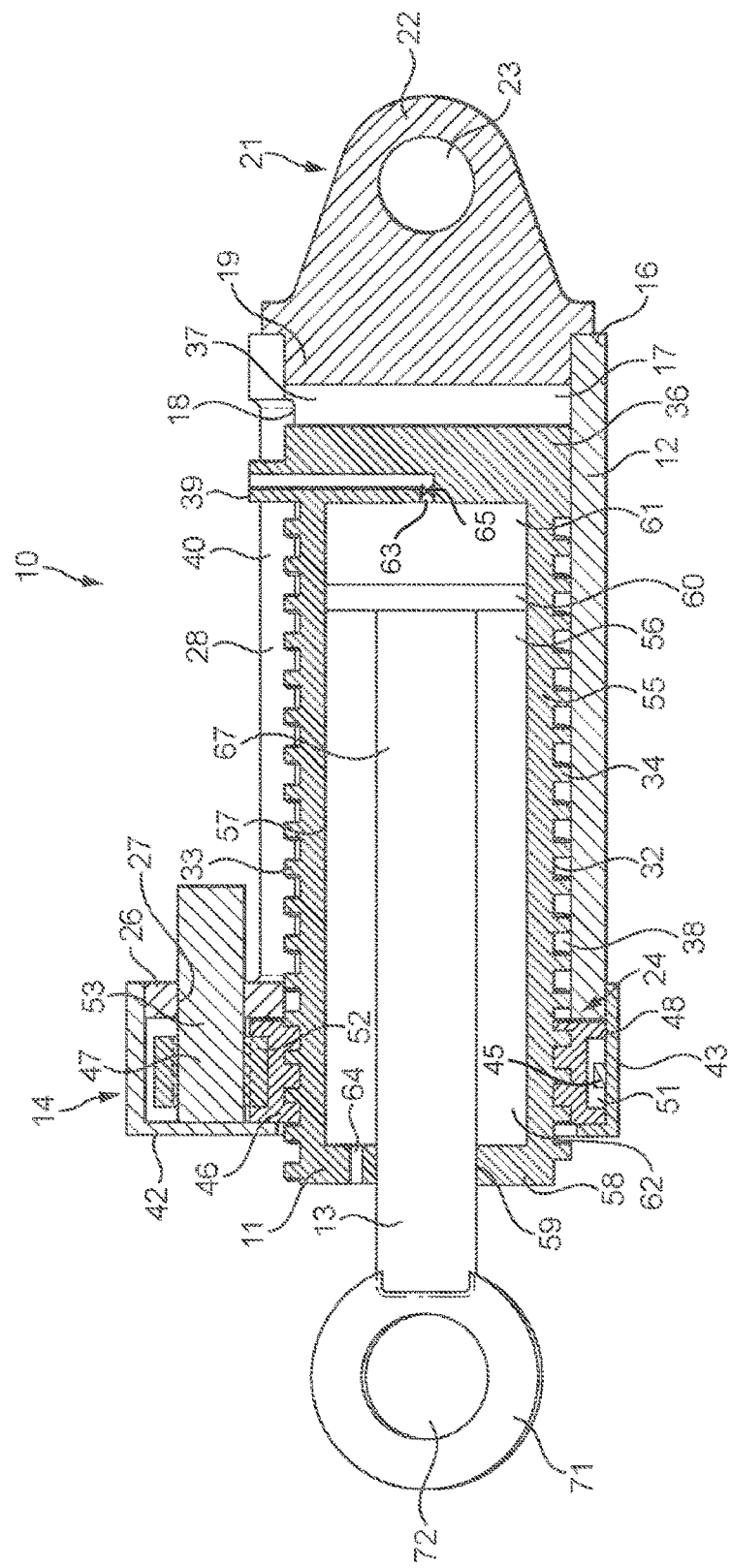
FIG. 5 shows a schematic cross-sectional side view of the actuator shown in FIG. 4.

The actuator 10 is shown in more detail in FIG. 4 and FIG. 5. The actuator 10 is configured to move an aerodynamic surface 2 of the aircraft 1, specifically the outboard portion 7 relative to the rest of the main wing 4 as shown in FIG. 2 and FIG. 3. The actuator 10 is only deployed when the aircraft 1 is on the ground so that the aircraft 1 can get clearance to leave the runway and taxi to a terminal gate.

Referring to FIG. 4 and FIG. 5, the actuator 10 comprises an inner cylinder 11 received in an outer cylinder 12. The actuator 10 further comprises a piston 13 received in the inner cylinder 11 that extends from the inner cylinder 11 and the outer cylinder 12. The piston 13 is slidable relative to the inner cylinder 11 and the outer cylinder 12 in response the application of fluid pressure to cause the piston 13 to extend further from the inner cylinder 11 and the outer cylinder 12. The auxiliary drive mechanism 14 is operable to cause the inner cylinder 11 to extend from the outer cylinder 12, wherein the piston 13 moves together with the inner cylinder 11 relative to the outer cylinder 12. This arrangement of the actuator 10 minimises its size.

The outer cylinder 12 comprises a first tubular portion 16. The first tubular portion 16 is hollow and comprises a first cavity 17. Therefore, the first tubular portion 16 also comprises a first inner surface 18 which defines the first cavity 17. The first cavity 17 is also cylindrical, although in other embodiments its shape may vary.

The outer cylinder 12 further comprises a first end wall 19. The first end wall 19 has a circular cross-section and is configured to seal one end of the first cavity 17 of the first tubular portion 16 closed. It will be understood, that the shape of the first end wall 19 will be configured to cooperatively seal the first cavity 17 at one end of the first tubular portion 16.

The outer cylinder 12 further comprises a first mounting portion 21. The first mounting portion 21 comprises a projection 22. The projection 22 has a generally triangular cross-section and extends away from the first cavity 17. The projection 22 comprises a first mounting aperture 23 configured to rotatably fix the actuator 10 to the main wing 4 or the outboard portion 7. The first mounting aperture 23 is circular which allows the actuator 10 to rotate about a beam (not shown) in the main wing 4 or outboard portion 7 whilst deploying or retracting the outboard portion 7.

As shown in FIG. 5, the opposing end of the first cavity 17 of the first tubular portion 16 of the outer cylinder 12 is an open end 24. In the present embodiment, the open end 24 is generally circular. The opposing end of the first tubular portion 16 of the outer cylinder 12 further comprises a first attachment portion 26. The first attachment portion 26 is a protrusion which extends in a radial direction perpendicularly to the longitudinal axis of the first tubular portion 16. The first attachment portion 26 is circular with a circular aperture 27. However, it will be understood that the first attachment portion 26 is not limited to this shape and may take other forms.

The outer cylinder 12 further comprises a channel 28 in the first inner surface 18 of the first tubular portion 16. The channel 28 extends parallel to the longitudinal axis of the outer cylinder 12. The channel 28 extends through the thickness of the circumferential wall that forms the first tubular portion 16 of the outer cylinder 12.

Referring now to FIG. 4 and FIG. 5, the actuator 10 further comprises the inner cylinder 11. The inner cylinder 11 is located in the outer cylinder 12. In the present embodiment, the inner cylinder 11 is co-axial with the outer cylinder 12. The inner cylinder 11 comprises an outer surface 32 configured to be urgeable through the open end 24 of the outer cylinder 12. The outer surface 32 comprises a tooth. The tooth is configured to be engaged to move the inner cylinder 11 relative to the outer cylinder 12 as will be explained hereinafter.

In the present embodiment, the tooth is a helical thread 33. The helical thread 33 comprises a single continuous crest 34 which extends in a helical pattern about the outer surface 32 of the inner cylinder 11. The helical thread 33 extends around the circumference of the outer surface 32 from one end of the inner cylinder 11 towards the opposing end.

However, in alternative embodiments of the invention, the number of teeth having continuous crests 34 extending in a helical pattern about the outer surface 32 may vary. Furthermore, the teeth may be arranged in a different pattern, for example, multiple crests 34 may extend continuously around the outer surface 32 in a helical or circular pattern or the teeth may extend partially around the circumference of the outer surface 32 and be longitudinally aligned.

As shown in FIG. 5, the crest 34 of the helical thread 33 on the outer surface 32 of the inner cylinder 11 abuts the inner surface 18 of the first tubular portion 16 of the outer cylinder 12. Therefore, relative translational movement perpendicular to the longitudinal axis between the outer cylinder 12 and the inner cylinder 11 is reduced, if not eliminated. Furthermore, by limiting the contact surface area of the inner cylinder 11 on the first inner surface 18 of the outer cylinder 12 the force due to friction that must be overcome by the auxiliary drive mechanism 14 of the actuator 10 is reduced.

The inner cylinder 11 of the actuator 10 further comprises a base wall 36. The base wall 36 is located proximate the closed end of the first tubular portion 16 of the outer cylinder 12. The base wall 36 is located proximate to the first end wall 19 of the first mounting portion 21. The circumference of the base wall 36 is configured to abut the first inner surface 18 of the first tubular portion 16. Therefore, the base wall 36 divides the first cavity 17 into a first chamber 37 and a second chamber 38.

The inner cylinder 11 further comprises a protrusion 39. The protrusion 39 protrudes perpendicularly from the outer surface 32 at the base wall 36 end of the inner cylinder 11 and extends partially about its circumference. The protrusion 39 is configured to locate in the channel 28 in the first inner surface 18 of the outer cylinder 12. The protrusion 39 is configured to abut side walls 40 of the channel 28. In the present embodiment, the protrusion 39 is generally rectangular in cross-section. The protrusion 39 located in the channel 28 prevents the inner cylinder 11 from rotating in the outer cylinder 12 and ensures that when there is relative movement between the outer cylinder 12 and inner cylinder 11 it is translational.

Figure 6:
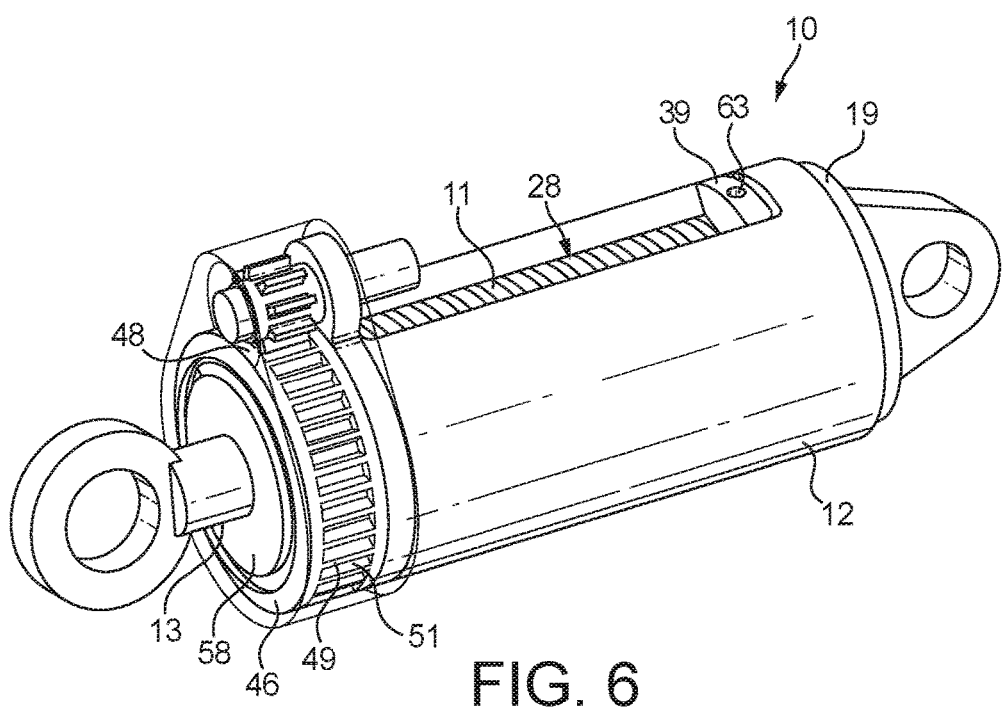
FIG. 6 shows a perspective view of the actuator shown in FIG. 4 in a fully retracted position with a transparent housing and a drive omitted.
Figure 7:
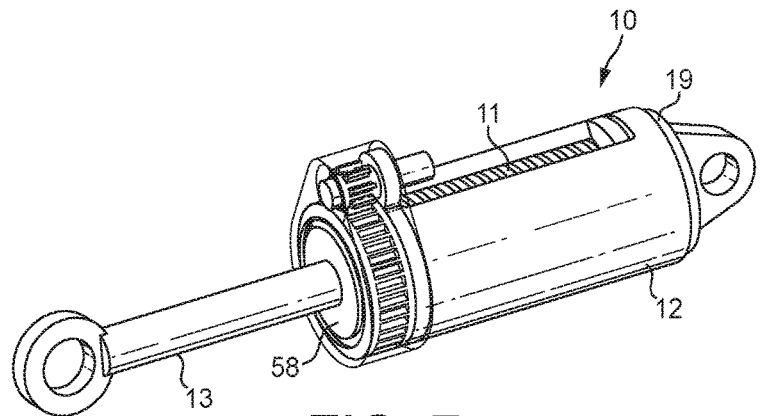
FIG. 7 shows a perspective view of the actuator shown in FIG. 4 with a piston in a fully deployed position and an inner cylinder in a fully retracted position with the transparent housing and the drive omitted.

When either the base wall 36 of the inner cylinder 11 abuts the first end wall 19 of the outer cylinder 12 and/or the protrusion 39 abuts the end of the channel 28 proximate the first end wall 19 of the outer cylinder 12, the inner cylinder 11 is in its fully retracted position in the outer cylinder 12, as shown in FIG. 6 and FIG. 7. Referring back to FIG. 5, the base wall 36 may prevent fluid communication between the first chamber 37 and the channel 28 when the inner cylinder 11 is in its fully retracted position. Whilst the inner cylinder 11 is in the fully retracted position its other end protrudes through the open end 24 of the outer cylinder 12. Therefore, in the present embodiment, the inner cylinder 11 always extends out of the outer cylinder 12.

Referring now to FIG. 4 and FIG. 5, the auxiliary drive mechanism 14 comprises a housing 42 at the open end 24 of the outer cylinder 12. The housing 42 protects part of the auxiliary drive mechanism 14 and prevents the auxiliary drive mechanism 14 moving relative to the outer cylinder 12. A collar 43 overlaps the outer surface of the outer cylinder 12 at the open end 24 and the housing 42 cooperates with the first attachment portion 26, shown in FIG. 5, to prevent movement relative to the outer cylinder 12.

The housing 42 of the auxiliary drive mechanism 14 further comprises an opening 44. The opening 44 is configured to receive the inner cylinder 11 and allow the inner cylinder 11 to move relative to the housing 42 of the auxiliary drive mechanism 14. The opening 44 is co-axial with the inner cylinder 11.

The auxiliary drive mechanism 14 further comprises a drive gear 46 configured to engage the outer surface 32 of the inner cylinder 11 that protrudes from the outer cylinder 12. The drive gear 46 is further configured to selectively urge the inner cylinder 11 into position relative to the outer cylinder 12. That is, the drive gear 46 is rotated when there is an absence or loss of fluid pressure, or the actuator 10 needs to be deployed further to, for example, increase the angle through which the outboard portion 7, shown in FIG. 3, rotates.

In the present embodiment, the drive gear 46 is a collar nut. That is, the drive gear 46 is ring shaped and extends circumferentially around the end of the inner cylinder 11 that extends out of the open end 24 of the outer cylinder 12. The drive gear 46 is co-axial with the inner cylinder 11 and therefore, the outer cylinder 12. The drive gear 46 has an inner surface (not shown) that is configured to engage with the helical thread 33 on the outer surface 32 of the inner cylinder 11. When the inner cylinder 11 is in its fully retracted position, as shown in FIG. 6 and FIG. 7, it may not extend out of the housing 42 of the auxiliary drive mechanism 14.

However, in an alternative embodiment, the auxiliary drive mechanism 14 may be located in the outer cylinder 12. Therefore, the auxiliary drive mechanism 14 may be located between the inner cylinder 11 and the outer cylinder 12. In such an embodiment, when the inner cylinder 11 is in its fully retracted position it may not protrude out of the outer cylinder 12. Furthermore, the auxiliary drive mechanism 14 may be placed in the open end 24 such that the inner cylinder 11 does not protrude out of the opening 44 when fully retracted.

It will be understood, that in an alternative embodiment the drive gear 46 may not be a collar gear. Instead, the drive gear 46 may be, for example, but not limited to, a spur gear, a helical gear, or a bevel gear, etc. The teeth on the outer surface 32 of the inner cylinder 11 may be adapted to suit the type of drive gear 46.

Referring to FIG. 5, the auxiliary drive mechanism 14 further comprises a drive. In the present embodiment the drive comprises a pinion drive 47. An outer surface 48 of the drive gear 46 is configured to cooperate with the pinion drive 47 or alternatively, intermediate linking gears (not shown) turned by the pinion drive 47. The outer surface 48 comprises a plurality of teeth 49. The teeth 49 protrude in a radially outward direction from the outer surface 48 and extend parallel to the longitudinal axis of the actuator 10. Adjacent teeth 49 are located circumferentially on the outer surface 49 of the drive gear 46.

The teeth 49 are separated by a series of recesses 51. The recesses 51 are spaced circumferentially around the outer surface 48 of the drive gear 46. The pinion drive 47 comprises teeth 52 that cooperate with the recesses 51 to turn the drive gear 46 and move the inner cylinder 11 relative to the outer cylinder 12. It will be understood that the teeth 49 on the drive gear 46 may be modified to cooperate with the type of teeth 52 on the drive 47 or intermediate linking gears (not shown) turned by the drive 47.

The drive of the auxiliary drive mechanism 14 further comprises a motor (not shown). The motor is configured to act on a shaft 53 connected to the pinion gear 47 and, in turn, the drive gear 46 and cause them to rotate. The shaft 53 extends through the circular aperture 27 of the first attachment portion 26. The rotation of the drive gear 46 in turn causes translational motion of the inner cylinder 11. In the present embodiment, the motor is reversible. Therefore, the motor is configured to both deploy and retract the inner cylinder 11 from the outer cylinder 12 when there is an absence or loss of fluid pressure. In the present embodiment, shown in the figures, the pitch of the helical thread 33 on the inner cylinder 11 is small enough that the drive gear 46 cannot be back driven by the weight of the outboard portion 7 of the main wing 4, shown in FIG. 3. However, it will be understood that in an alternative embodiment, the motor 47 may not be reversible but may be disengaged by a clutch (not shown) and gravity may be used to retract the inner cylinder 11.

The auxiliary drive mechanism 14 may further comprise a brake 45. The brake may be configured to engage at least one of the teeth 49 on the outer surface 48 of the drive gear 46 to prevent movement of the inner cylinder 11 relative to the outer cylinder 12 when the actuator 10 is being actuated by fluid pressure only or two hold a partially deployed inner cylinder 11 in position. The brake may be a safety break which is used only in the event that there is a loss of both hydraulic and electric power.

Optionally, the auxiliary drive mechanism 14 may comprise an external crank (not shown). The external crank may be used as a back-up system for the motor (not shown) of the auxiliary drive mechanism 14 or instead of the motor. The external crank may allow a person to manually operate the actuator 10. The external crank may be integrally formed with the auxiliary drive mechanism 14. Alternatively, the external crank may be an attachment and the auxiliary drive mechanism 14 may comprise an engaging port (not shown) for the crank.

Referring to FIG. 5, the inner cylinder 11 further comprises a second tubular portion 55. In the present embodiment, the second tubular portion 55 is cylindrical and hollow. The second tubular portion 55 comprises a second cavity 56 defined by a second inner surface 57. The second cavity 56 is also cylindrical, although in other embodiments its shape may vary.

The inner cylinder 11 further comprises a second end wall 58. The second end wall 58 is located at the opposite end of the second tubular portion 55 of the inner cylinder 11 to the base wall 36. The second end wall 58 is circular and comprises an orifice 59. The orifice 59 extends through the end wall 58 in a direction parallel to the longitudinal axis of the actuator 10. In the present embodiment, the orifice 59 is co-axial with the second tubular portion 55 of the inner cylinder 11.

The piston 13 is received in the second cavity 56 of the inner cylinder 11. The piston 13 comprises a piston head 60. The piston head 60 is configured to divide the second cavity 56 into third and fourth chambers 61, 62. Therefore, the edge of the piston head 60 may abut the second inner surface 57 of the second tubular portion 55. The piston head 60 may comprise a sealing arrangement (not shown), such as an O-ring, to prevent the third and fourth chambers 61, 62 from being in fluid communication.

The third chamber 61 is defined by the base wall 36, the second inner surface 57, and the piston 13. The third chamber 61 is configured to receive an injectable fluid (not shown). A first inlet 63 is formed by an aperture in the base wall 36 of the inner cylinder 11. The first inlet 63 is formed in the protrusion 39 and extends down into the base wall 36 before extending into the third chamber 61. The first inlet 63 is configured to allow the fluid to be injected into the third chamber 61 of the second cavity 56 to position the piston 13 relative to the inner cylinder 11 and auxiliary drive mechanism 14. The first inlet 63 may be connected to a flexible hose (not shown) at the protrusion 39 end which is connected to a pump and fluid reservoir (not shown in the Figures).

By placing the first inlet 63 in the protrusion and the base wall 36, the channel 28 does not need to be covered resulting in the hydraulic system being simplified to prevent leaks and allowing greater flexibility in deployment of the inner and outer cylinders 11, 12. However, it will be understood that in alternative embodiments the first inlet 63 may be configured differently.

Injecting fluid into the third chamber 61 of the inner cylinder 11 causes the piston 13 to be urged from the retracted position proximate to or abutted against the base wall 36 of the inner cylinder 11 to the deployed or partially deployed position in which the piston 13 moves away from the base wall 36. The first inlet 63 may also be used as an outlet when retracting piston 13 in the inner cylinder 12.

The first inlet 63 comprises a first valve 65. The first valve 65 is configured to automatically close upon loss of fluid pressure. Closing the first valve prevents the piston 13 from being urged back towards the retracted position in the event of a loss of fluid pressure.

The piston 13 further comprises a shaft 67. The shaft 67 is connected to the piston head 60 and extends through the fourth chamber 62 and the orifice 59 in the second end wall 58 out of the inner cylinder 11 and outer cylinder 12. The shaft 67 is a cylindrical rod which extends in a direction parallel to the longitudinal axis of the actuator 10. In the present embodiment, the shaft 67 is longer than the second cavity 55 of the inner cylinder 11. Therefore, the piston head 60 is able to travel the full length of the second cavity 55.

The inner cylinder 11 comprises a second inlet 64 in the second end wall 58 of the inner cylinder 11. The second inlet 64 is configured to allow fluid to be injected into the fourth chamber 62 for retracting the piston 13. The second inlet 64 may also be connected to a flexible hose (not shown) which is connected to a pump and fluid reservoir (not shown in the Figures). Injecting fluid into the third chamber 62 of the inner cylinder causes the piston 13 to be urged from the deployed position proximate to or abutted against the second end wall 58 of the inner cylinder 11 to the retracted or partially deployed position in which the piston 13 moves towards the base wall 36 of the inner cylinder 11. The orifice 59 may comprise a sealing arrangement (not shown) to prevent the leakage of any fluid received in the fourth chamber 62.

At the opposing end of the shaft 67 to the piston head 60 is a second mounting portion 71. The second mounting portion 71 comprises a second mounting aperture 72 configured to rotatably fix the actuator 10 to the main wing 4 or the outboard portion 7. The second mounting aperture 72 allows the actuator 10 to rotate about a beam (not shown) in the main wing 4 or outboard portion 7 whilst deploying or retracting the outboard portion 7.

When the first mounting portion 21 is connected to the main wing 4, the second mounting portion 71 is connected to the outboard portion 7. In an alternative embodiment, the first mounting portion 21 may be connected to the outboard portion 7 and the second mounting portion 71 may be connected to the main wing 4.

In the present embodiment, the distance that the channel 28 extends and the length that the helical thread 33 on the outer surface 32 of the inner cylinder 11 extends in the direction parallel to the longitudinal axis of the actuator 10 is at least as long as the length of the second cavity 56 in the inner cylinder 11. That is, the maximum travel length of the piston 13 from the base wall 36 to the second end wall 58 of the inner cylinder 11.

In alternative embodiment, the distance that the channel 28 extends and the length that the helical thread 33, or alternative configuration of teeth, on the outer surface 32 of the inner cylinder 11 extends in the direction parallel to the longitudinal axis of the actuator 10 may be less than the length of the second cavity 56 in the inner cylinder 11 but long enough to cause the outboard portion 7 to rotate through a minimum angle relative to the main wing 4 to allow the aircraft 1 to leave the runway and dock with a terminal gate.

The method of deploying the actuator 10 will now be described with reference to the schematic perspective views shown in FIG. 6 to FIG. 9 of the actuator 10 in various stages of deployment. FIG. 6 shows the actuator 10 in its fully retracted position. Both the inner cylinder 11 and the piston 13 are fully retracted. That is, the base wall 36 of the inner cylinder 11 abuts the first end wall 19 of the outer cylinder 12 and/or the protrusion 39 abuts the end of the channel 28 proximate the first end wall 19 of the outer cylinder 12 and the piston head 60 of the piston 13 abuts or is proximate to the base wall 36 of the inner cylinder 11 or the second mounting portion 71 abuts the second end wall 58 of the inner cylinder 11.

A fluid is injected into third chamber 61 in the inner cylinder 11 through the first inlet 63 in the base wall 36. As there is no fluid pressure on the base wall 36, the inner cylinder 11 does not move. The increased pressure in the third chamber 61 acts on the piston 13 and causes the piston head 60 to be urged away from the base wall 36 towards the second end wall 58. The fluid may be injected into the third chamber 61 until the piston head 60 abuts the second end wall 58 at which point the piston 13 is fully deployed and the inner cylinder 11 is fully retracted as shown in FIG. 7.

Figure 8:
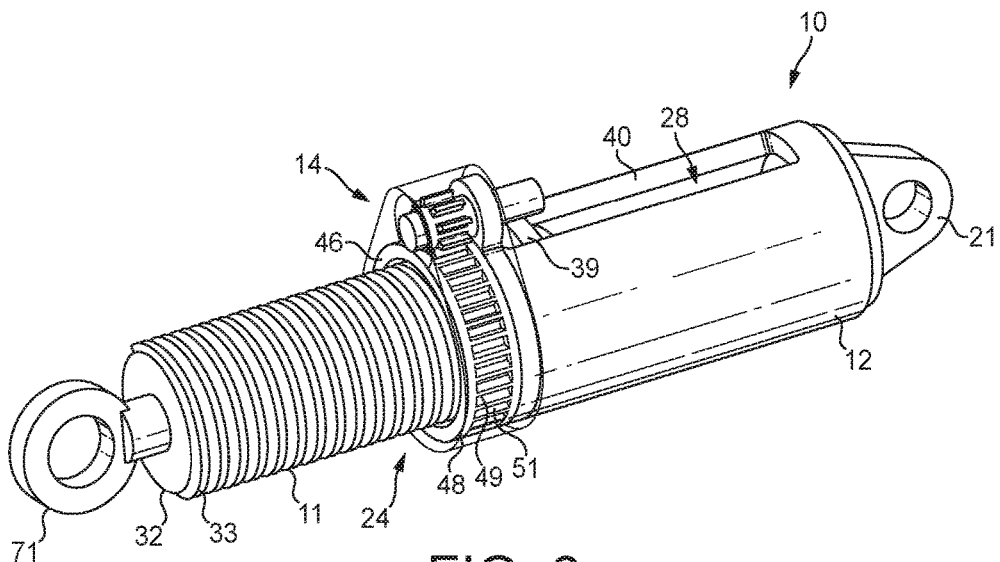
FIG. 8 shows a perspective view of the actuator shown in FIG. 4 with the piston in a fully retracted position and the inner cylinder in the fully deployed position with the transparent housing and the drive omitted.

Referring to FIG. 8, the actuator 10 is shown with the inner cylinder 11 fully deployed and the piston 13 fully retracted. That is, the protrusion 39 of the inner cylinder 11 abuts the end of the channel 28 proximate to the open end 24 of the outer cylinder 12 and the piston head 60 of the piston 13 abuts the base wall 36 of the inner cylinder 11.

FIG. 8 shows the case where there is an absence or has been a loss of fluid pressure. Therefore, in order to actuate the actuator 10 and, for example, fold the outboard portion 7 of an aircraft's main wing 4 the auxiliary drive mechanism 14 is used. The pump (not shown) of the fluid system (not shown) is turned off and any valves (not shown) in the fluid system closed to prevent leakage. The motor (not shown) is turned on and rotates the pinion gear 47 and, in turn, the drive gear 46 whose inner surface is engaged with the helical thread 33 on the outer surface 32 of the inner cylinder 11. The projection 39 abuts against the side walls 40 of the channel 28 to prevent the inner cylinder 11 from rotating in the outer cylinder 12 and instead causes the inner cylinder 11 to be urged out of the open end 24 of the outer cylinder 12 until the projection 39 abuts against the end of the channel 28 proximate the open end 24. The safety brake (not shown) may be released before the motor is turned on and reengaged once the inner cylinder 11 has been urged far enough out of the outer cylinder 12.

Figure 9:
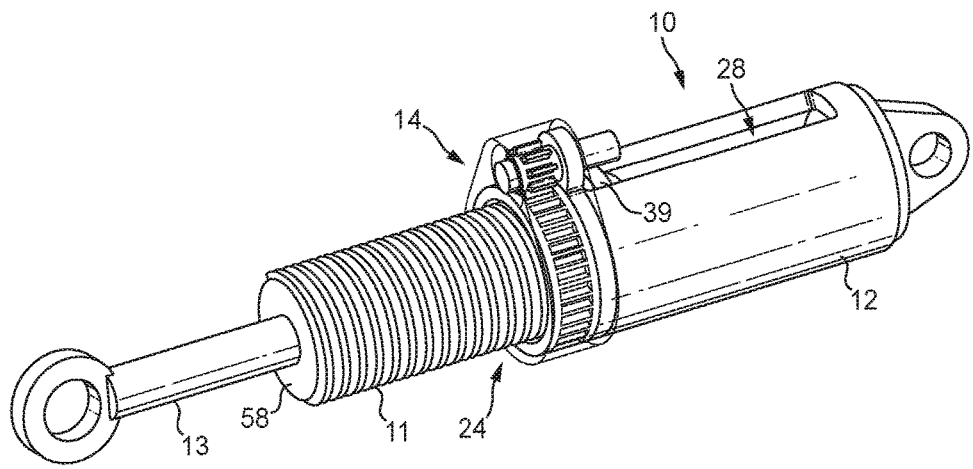
FIG. 9 shows a perspective view of the actuator shown in FIG. 4 in the fully deployed position with the transparent housing and the drive omitted.

Referring to FIG. 9, the actuator 10 is shown with both the inner cylinder 11 and the piston 13 fully deployed. That is, the piston head 60 of the piston 13 is in abutment with the second end wall 58 of the inner cylinder 11 and the projection 39 is in abutment against the end of the channel 28 proximate the open end 24.

In the present embodiment, in order to fully deploy the piston 13, the same method is followed as described above regarding FIG. 6 and FIG. 7. Once the piston 13 has been fully deployed, fluid pressure is maintained, or alternatively, the valves (not shown) in the first and second inlets (not shown in FIG. 9) to the third and fourth chambers 61, 62 of the second cavity 56 in the inner cylinder 11 is closed. Therefore, the weight of the outboard portion 7 cannot force the fluid out of the first and second inlets, acting as a potential outlet, and cannot force the piston 13 back towards its retracted position. The inner cylinder 11 is then actuated as described above in relation to FIG. 8. It will be understood that the two systems may be operated simultaneously or in any order.

In the event that the piston head 60 of the piston 13 has been urged partially along the second cavity 55 of the inner cylinder 11 and then there is a loss of fluid pressure, the piston 13 will return to its retracted position. Alternatively, the valves (not shown) may be configured to automatically close. This prevents retraction of the piston 13. Then the auxiliary drive mechanism 14 may be used to urge the second mounting portion 71 to the predetermined minimum distance from the first mounting portion 21. Alternatively, the auxiliary drive mechanism 14 may be used to fully deploy the inner cylinder 11.

In the present embodiment, the auxiliary drive mechanism 14 is designed to be used primarily when there is an absence or loss of fluid pressure. The fluid acting on the piston 13 is capable of moving heavy loads, like the outboard portion 7 of the main wing 4, quickly, enabling an aircraft 1 to leave the runway promptly. However, the fluid systems are more prone to failure or complications than the auxiliary drive mechanism 14 and the inner cylinder 11.

Therefore, the auxiliary drive mechanism 14 acts as a fail-safe. The auxiliary drive mechanism 14 does not have to move the inner cylinder 11 relative to the outer cylinder 12 as quickly as the injectable fluid moves the piston 13 relative to the cylinders 11, 12 but will still allow aircraft 1 to leave the runway without causing major disruptions. Furthermore, by preventing the auxiliary drive mechanism 14 from moving when the piston 13 is actuated, the normal wear and tear associated with such a mechanism is minimised which prolongs the life of the actuator 10.

In an alternative embodiment, the channel 28 may extend partially through the thickness of the first tubular portion 16, such that the channel 28 has a top wall (not shown) configured to seal channel 28 closed. In such an embodiment, the protrusion 39 is configured to abut side walls 40 and top wall (not shown) of the channel 28 and the first inlet 63 may be located in the base wall 39 and the first end wall 19.

In such an embodiment, the first and second chambers 37, 38 may not be in fluid communication. The base wall 36 and protrusion 39 may be provided with a sealing arrangement (not shown) to prevent fluid communication between the two chambers 37, 38. Therefore, it is possible to operate the inner cylinder 11 and the piston 13 simultaneously, or use the only fluid pressure to deploy the inner cylinder 11 and the piston 13.

The invention claimed is:
1. An actuator, comprising:
   an inner cylinder received in an outer cylinder having a closed end, and a piston received in the inner cylinder that extends from the inner cylinder and the outer cylinder, the piston being slideable relative to the inner cylinder and the outer cylinder in response to the application of fluid pressure to cause the piston to extend further from the inner cylinder and the outer cylinder; and an auxiliary drive mechanism operable to cause the inner cylinder to extend from the outer cylinder, wherein the piston moves together with the inner cylinder relative to the outer cylinder.

2. The actuator according to claim 1, wherein the inner cylinder comprises an outer surface and the auxiliary drive mechanism includes a drive member in engagement with said outer surface to cause the inner cylinder to extend from the outer cylinder in response to rotation of said drive member.

3. The actuator according to claim 2, wherein the outer surface comprises a helical thread, and the drive member comprises a rotatably mounted drive gear, the drive gear being in threaded engagement with said helical thread such that rotation of the drive gear causes the inner cylinder to extend from the outer cylinder.

4. The actuator according to claim 3, wherein the auxiliary drive mechanism comprises a drive and the drive gear comprises drive engagement elements, wherein the drive cooperates with said drive engagement elements to rotate the drive gear in response to operation of said drive.

5. The actuator according to claim 4, wherein the drive engagement elements comprise a series of recesses spaced circumferentially around an outside of the drive gear and the drive comprises a driven gear having teeth that cooperate with said recesses.

6. The actuator according to claim 4, wherein the drive further comprises a motor or a manually operated crank which is connectable to the driven gear.

7. The actuator according to claim 1, comprising an opening in the inner cylinder to allow fluid to flow into the inner cylinder to apply fluid pressure to the piston and cause it to move relative to the inner cylinder.

8. The actuator according to claim 7, wherein the opening comprises a valve configured to close upon loss of fluid pressure.

9. The actuator according to claim 1, wherein the auxiliary drive mechanism further comprises a brake configured to selectively prevent movement of the inner cylinder relative to the outer cylinder.

10. The actuator according to claim 1, wherein the piston comprises a piston head received in the inner cylinder and a shaft extending out of the inner and outer cylinders through an orifice in an end wall of the inner cylinder.

11. An aircraft comprising an actuator according to claim 1.

12. An actuator, comprising:

an inner cylinder received in an outer cylinder and a piston received in the inner cylinder that extends from the inner cylinder and the outer cylinder, the piston being slideable relative to the inner cylinder and the outer cylinder in response to the application of fluid pressure to cause the piston to extend further from the inner cylinder and the outer cylinder;

an auxiliary drive mechanism operable to cause the inner cylinder to extend from the outer cylinder, wherein the piston moves together with the inner cylinder relative to the outer cylinder; and, wherein the inner and outer cylinders include cooperating elements to prevent rotation of the inner cylinder relative to the outer cylinder.

13. The actuator according to claim 12, wherein the cooperating elements comprise a protrusion on the inner cylinder that is slideably received in an axially extending channel in the outer cylinder.

14. A method of controlling an actuator that comprises an inner cylinder received in an outer cylinder having a closed end, and a piston received in the inner cylinder that extends from the inner cylinder and the outer cylinder, the piston being slideable relative to the inner cylinder and the outer cylinder in response to the application of fluid pressure to cause the piston to extend further from the inner cylinder and the outer cylinder;

the method comprising operating an auxiliary drive mechanism to cause the inner cylinder to extend from the outer cylinder so that the piston moves together with the inner cylinder relative to the outer cylinder, in the absence of sufficient fluid pressure to cause the piston to slide relative to the inner cylinder.

15. The method of controlling the actuator according to claim 14, wherein the auxiliary drive mechanism comprises a drive gear rotatable to cause the inner cylinder to extend from the outer cylinder, the method comprising preventing the drive gear from rotating when the fluid pressure is sufficient to cause the piston to slide relative to the inner cylinder.

* * * * *